United States Patent [19]
Takahashi et al.

[11] Patent Number: 5,280,308
[45] Date of Patent: Jan. 18, 1994

[54] SHEET FEEDING DEVICE

[75] Inventors: Haruhiko Takahashi, Yokohama; Makoto Takamiya, Kawasaki; Kosuke Yamamoto; Hidejiro Kadowaki, both of Yokohama; Ken Tsuchii, Tokyo; Masafumi Wataya, Kawasaki; Toshiyuki Yanaka, Tokyo, all of Japan

[73] Assignee: Canon Kabushiki Kaisha, Tokyo, Japan

[21] Appl. No.: 851,239

[22] Filed: Mar. 13, 1992

Related U.S. Application Data

[63] Continuation of Ser. No. 482,823, Feb. 21, 1990, abandoned.

[30] Foreign Application Priority Data

Feb. 23, 1989 [JP] Japan ................................. 1-43804

[51] Int. Cl.5 ............................................ G01D 15/24
[52] U.S. Cl. ..................................... 346/134; 271/275; 271/193; 198/840; 346/140 R; 474/92
[58] Field of Search ............... 271/275, 193, 198, 199, 271/200, 201, 202, 203; 198/840; 346/134, 140 R

[56] References Cited

U.S. PATENT DOCUMENTS

| 589,627 | 9/1897 | Springer | 198/840 X |
|---|---|---|---|
| 3,088,581 | 5/1963 | Rostal | 198/840 X |
| 3,981,391 | 9/1976 | Phillips et al. | 198/840 |
| 4,200,016 | 4/1980 | Helmig et al. | 271/202 |
| 4,207,579 | 6/1980 | Gamblin et al. | 346/75 |
| 4,287,984 | 9/1981 | Okamoto et al. | 271/275 X |
| 4,302,002 | 11/1981 | Hashimoto | 271/275 X |
| 4,823,942 | 4/1989 | Martin et al. | 271/275 X |
| 4,832,186 | 5/1989 | Conrad | 198/840 |

FOREIGN PATENT DOCUMENTS

| 48408 | 8/1984 | Fed. Rep. of Germany | 271/275 |
|---|---|---|---|
| 56-127501 | 10/1981 | Japan. | |
| 57-131649 | 8/1982 | Japan. | |
| 58-109339 | 6/1983 | Japan. | |

Primary Examiner—Robert P. Olszewski
Assistant Examiner—Carol Lynn Druzbick
Attorney, Agent, or Firm—Fitzpatrick, Cella, Harper & Scinto

[57] ABSTRACT

This invention relates to a sheet feeding device having an endless belt for feeding a sheet; multiple rotation members bodies supporting the endless belt and including at least one crown roller, a cylindrical rotational member located between the crown roller and a first body member among the multiple rotation members from the crown roller in the endless belt moving direction.

12 Claims, 6 Drawing Sheets

SHEET FEEDING DEVICE

This application is a continuation of application Ser. No. 07/482,823 filed Feb. 21, 1990, now abandoned.

BACKGROUND OF THE INVENTION

1. Field of the Invention

The present invention is directed to a sheet feeding device, more particularly to a sheet feeding device which supplies a wide cutsheet that is greater than B5 in size on an endless belt, utilizing electrostatic absorption.

2. Related Background Art

Liquid injection recording devices (ink jet recording devices) which record text and images by delivering recording fluid from the recording head utilizing heat energy etc. are widely known.

These devices mainly use cutsheets such as sheets of paper or plastic as the recording sheet. This method emits low operational noise compared to other recording methods, and is superior in that its basic mechanical structures are simpler and inexpensive than other devices. This method has been employed in various fields, such as the fields of recording output devices for computers and word processors, for these reasons.

Presently, due to demands for high speed recording output the line type recording head which contains a printing area that covers the entire width of the cutsheet is being developed. This method attempts to accelerate the recording process by feeding the recording paper along a fixed recording head while maintaining the paper on a belt or an equivalent method of conveyance using procedures such as electrostatic adsorption etc.

However there are, special considerations required to prevent the belt from skewing in the orthogonal to direction the feeding direction, when rotating an endless belt which contains a width longer than the feeding orthogonal direction of the cutsheet.

One of the examples of a method for prevention of skewing is a method of moving the idle roller axis so that the belt returns to its original position, according to the skew amount for the belt detected by a sensor. This method is relatively trustworthy, but the device tends to become complex and expensive. Also, there is a problem of the printed character bending in the sub-scanning direction since the belt will be constantly repeat skewing in either direction when utilizing this method.

Another example is a method which causes a rib supplied on the inner side of the belt to correspond to the groove on the roller. Under these circumstances, virtually no skewing will occur, but the two disadvantages are that the belt will be expensive and the endurance will be negligible. This signifies that both of the above methods are unsatisfactory in either performance or endurance in spite of their complex devices and high costs.

Therefore, there is necessity for belt carriages that utilize the crown roller, which is the simplest method possessing the highest endurance. In this method, there is a necessity to increase the centripetal force of the belt using a larger crown to maintain as little skewing as possible, when the width of the endless belt is larger than the cutsheet feeding orthogonal direction, such as those endless belts containing widths which are larger than 200 mm, or those belts with low rigidity. Under these circumstances, there was a defect in that the unevenness of the intensity or scratches on the belt would cause buckling above the crown roller around the center of the belt, resulting in wrinkling and swelling of the belt.

SUMMARY OF THE INVENTION

The purpose of the present invention is to provide a cutsheets feeding method which is capable of inexpensive, long term and stabilized operation. It delivers the cutsheet by utilizing a device which has at least one crown roller equipped with a press roller in its upper part.

The features of the present invention for accomplishing the above objects is as follows. The cutsheet feeding device consists of a belt carrier device 14 which consists of an endless belt (11) wrapped and rotated on multiple rollers (12, 15 and 17). The cutsheet (3) is fed by said endless belt (11). The width of said endless belt is fabricated larger than said cutsheet (3), and at least one of said multiple rollers is fabricated as a crown roller (15). A cylindrical roller (19) which contacts the surface of said endless belt (11) is supplied between said crown roller (15) and said roller (17) which is the first in the upper feed area side of said crown roller (15), to feed said cutsheet (3).

DETAILED DESCRIPTION OF THE PREFERRED EMBODIMENTS

This section will provide explanations for embodiments of the present invention referring to the drawings.

Figure 1:
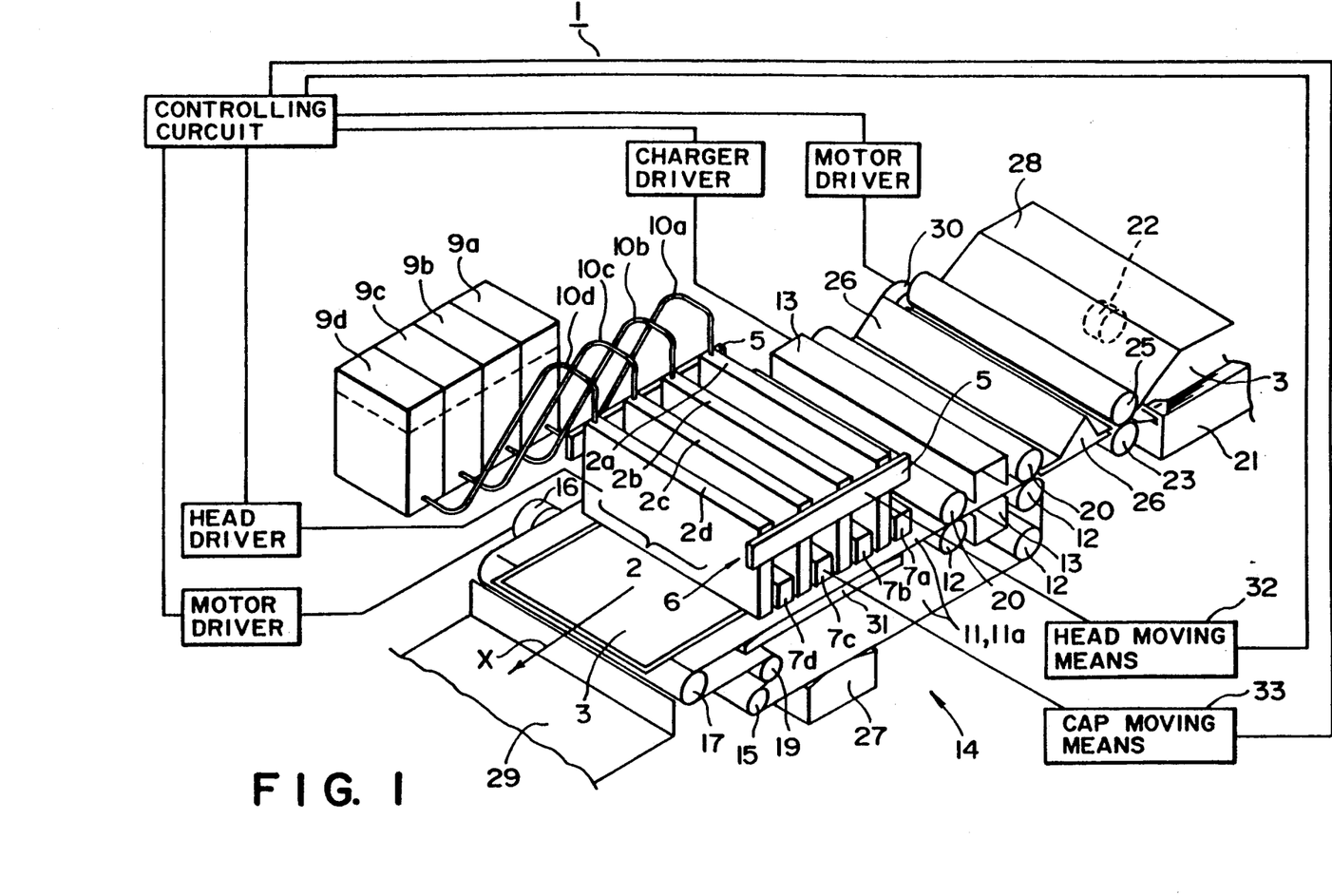
FIG. 1 is a slant view of an embodiment of the present invention.

FIG. 1 shows an ink jet recording device 1. The recording head 2 contains 3456 nozzles on the underside, each nozzle located 16 dot/mm apart. These consist of black head 2a, cyan head 2b, magenta head 2c and yellow head 2d. They are fixed and maintained by holder 5 so that the distances between the nozzles for heads 2a, 2b, 2c, and 2d in the feeding direction of the recording paper 3 are constant. The head unit 6 which consists of head 2 and holder 5 is movable in an upward and downward direction utilizing a type of head driving method (not shown).

Numerals 7a, 7b, 7c and 7d are caps for securing the openings in each nozzle on head 2a, 2b, 2c, 2d of recording head 2 when it is not used for recording. The caps are movable in X direction utilizing a type of cap driving method (not shown). A sponge like ink absorber is attached to the interior of caps 7a, 7b, 7c and 7d to receive the dry delivering of ink from recording head 2. Numerals 9a, 9b, 9c and 9d are the ink tanks which correspond to heads 2a, 2b, 2c and 2d. The ink for each color advances by capillarity through ink supply tubes 10a, 10b, 10c and 10d to heads 2a, 2b, 2c and 2d. The water heads of ink tanks 9a, 9b, 9c and 9d are set a certain level lower than the nozzles of heads 2a, 2b, 2c and 2d.

Numeral 11 is a seamless belt. The belt carrier device 14 consists of rollers 12, 15, 17 etc. described below. In order to feed the recording paper 3, the belt contains an insulation layer 11a (approximately 10 Ωcm) with a thickness of approx. 50 μm on the surface of a 250 μm base thickness. The interior of this belt is grounded by the idle roller 12, and the surface is charged to about 1,500 V by charger 1.

A negative charge is applied to recording paper 3 by charger 13, and the recording paper 3 is fed by electrostatic absorption onto the surface of seamless belt 11. The seamless belt 11 is driven in X direction by the belt driving roller 15, which is connected to the driving motor 16. The belt driving roller 15 is a crown roller with a diameter of 22 mm at the center, and 20 mm at both ends. The surface of the middle portion of the belt driving roller is formed as a virtually circular arc. A hard rubber coating at 70 degrees is performed on the 15 mm diameter core bar of this roller. The seamless belt 11 transfers the recording paper 3 in the X direction.

Figure 7:
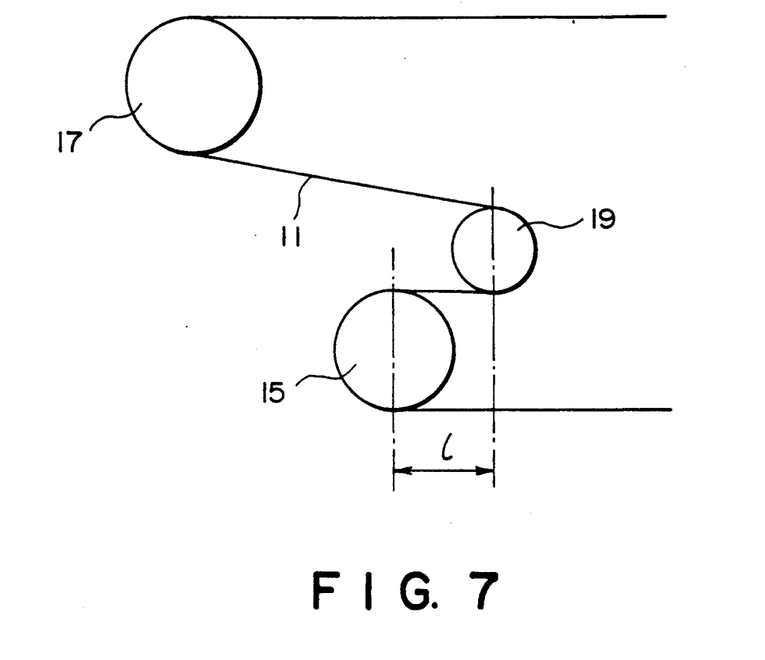
FIG. 7 is a layout drawing of the crown roller and the idle roller.

Numeral 17 is an idle roller with a 15 mm diameter which pulls the seamless belt 11. Numeral 19 is a presser roller (FIG. 7) with a constantly full length, cylindrical, 15 mm diameter placed in a position approximately 10 mm prior to the driving roller 15 (crown roller) to add constant tension to the seamless belt 11. Numeral 20 is the pinch roller which pressure contacts the seamless belt 11 near the charger 13, and strengthens the adsorption. Other idle rollers 12, 17, 19 excluding driving roller 15 are cylindrical rollers with constant full length diameters.

The recording paper 3 is assigned to be transferred by single sheets from the cassette 2 by the paper feed roller 22, then pass between carriage roller 23 and pinch roller 25, through guide 26, then pass between said pinch roller 20 and idle roller 12, then subsequently move onto seamless belt 11.

Numeral 27 in FIG. 1 is the cleaning unit which eliminates paper dust etc. from the surface of seamless belt 11. Numeral 29 is the paper eject tray which collects completed recording paper 3, and 30 is the paper feed motor. Numeral 31 is the base along the interior of belt 11, located under recording head 2.

Next, the operation of the present invention will be explained referring to FIGS. 2 through 6.

Figure 2:
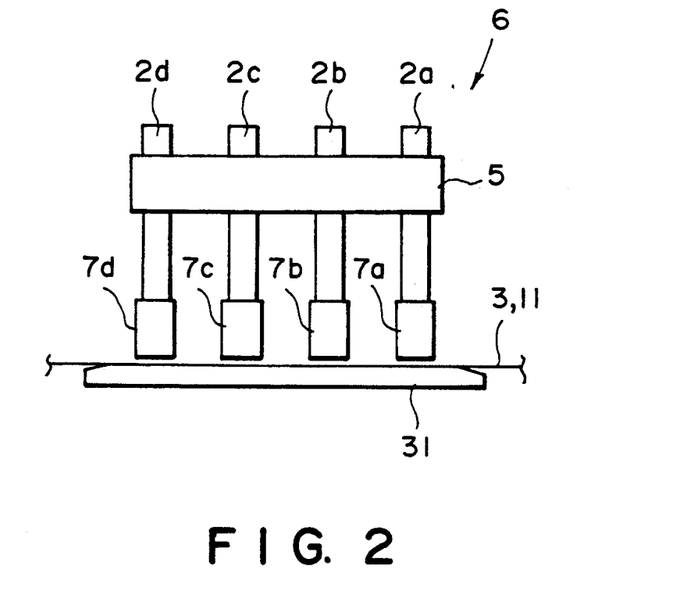
FIG. 2 through FIG. 5 are explanatory drawings to indicate the state of operation for the head unit and the cap.
Figure 3:
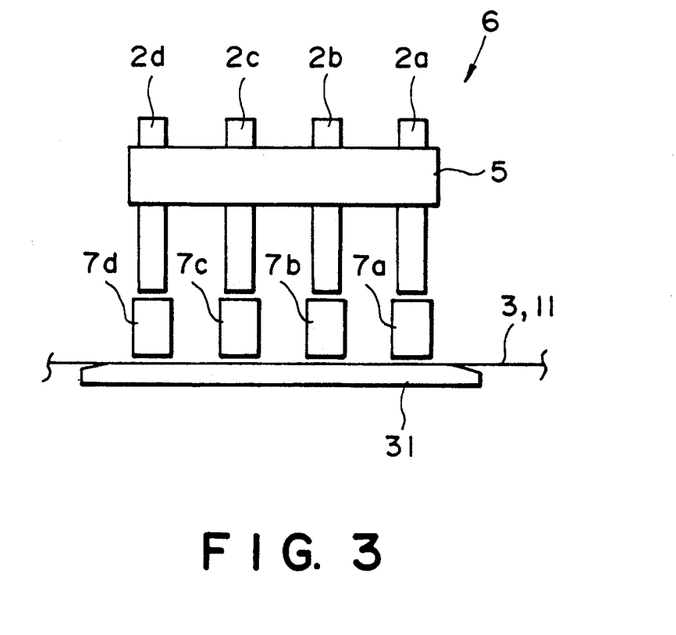
Figure 4:
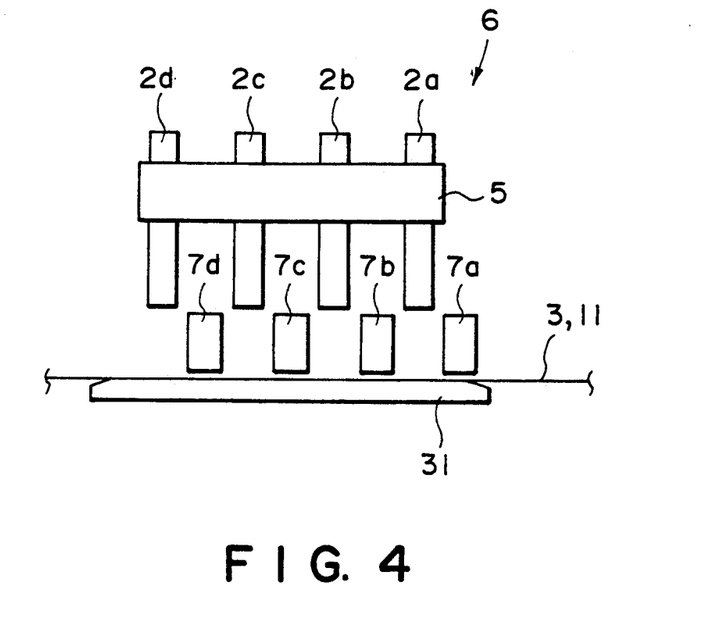
Figure 5:
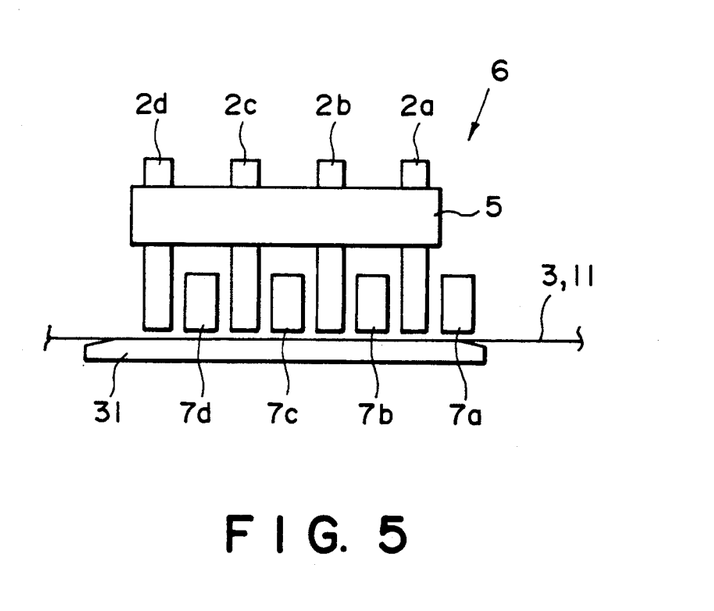

FIG. 2 shows the power OFF condition. The openings in heads 2a, 2b, 2c and 2d are secured with caps 7a, 7b, 7c and 7d to prevent the evaporation of ink from the tip of the nozzle. The head unit 6 is raised approximately 1 mm by the head driving method 32 (refer to FIG. 3 and step S2) when the power is turned ON in this condition (refer to step S1 in FIG. 6).

If a dry run signal is output, all nozzles will execute the dry run for the prescribed times. The dry run is normally executed when the power is turned ON and when approximately 100 sheets of paper are fed continuously. However, a user may input the signal by button operation when an unevenness in recording occurs (refer to steps S3 and S4 in FIG. 6). Caps 7a, 7b, 7c and 7d move in the direction which is opposite of direction X using the cap driving method 33. The caps are subsequently placed between heads 2a, 2b, 2c and 2d (refer to S5, FIG. 4 and step S5 in FIG. 6). The head unit 6 descends, and the tips of the nozzles are fixed in a recording position, approximately 1 mm from the surface of belt 11 (refer to FIG. 5 and step S6 in FIG. 6).

The paper feed motor 30 will turn ON, and a single sheet of recording paper 3 in the cassette 21 will be picked by the paper feed roller 22. The paper will be advanced by guide 28 and be positioned between the carriage roller 23 and the pinch roller 25 (refer to step S7 in FIG. 6). The edge of the recording paper 3 will be detected by the photosensor (not shown) located directly before the resist portion. The edge of the recording paper 3 will contact the resist portion (refer to step S8 in FIG. 6).

The paper feed motor 30 will turn OFF (refer to step S9 in FIG. 6) after a determined period of time. The extra sheets of recording paper 3 transferred will bend inside the hollow angle guide 26, and the elasticity of the recording paper 3 will cause the edge to align with the resist portion, maintaining the orthogonality with the feeding direction. The driving motor 16 and the charger 13 will turn ON. The recording paper 3 will be pressure contacted to belt 11 by the pinch roller 20 as it is advanced through the charger 13. The surface of belt 1 will be charged to approximately 1,500 V, and a negative charge is applied to the recording paper 3. The positive charge on the surface of belt 11 and the electrostatic force will cause the recording paper 3 to be adhered to belt 11, and after passing through charger 13, the pressure contact of pinch roller 20 will further secure the absorption. The feeding of recording paper 3 is synchronized with the start of driving motor 16. The recording with each color will begin when the tip of the paper contacts recording head 2 (step S11 of FIG. 6). The completed recorded paper 3 separates from the curvature of belt 11 at the idle roller 17, and is ejected onto the paper eject tray 29 (step S12 of FIG. 6). After the paper ejection process is complete, the driving motor 16 and the charger 13 will turn OFF (step S13 of FIG. 6).

Figure 6:
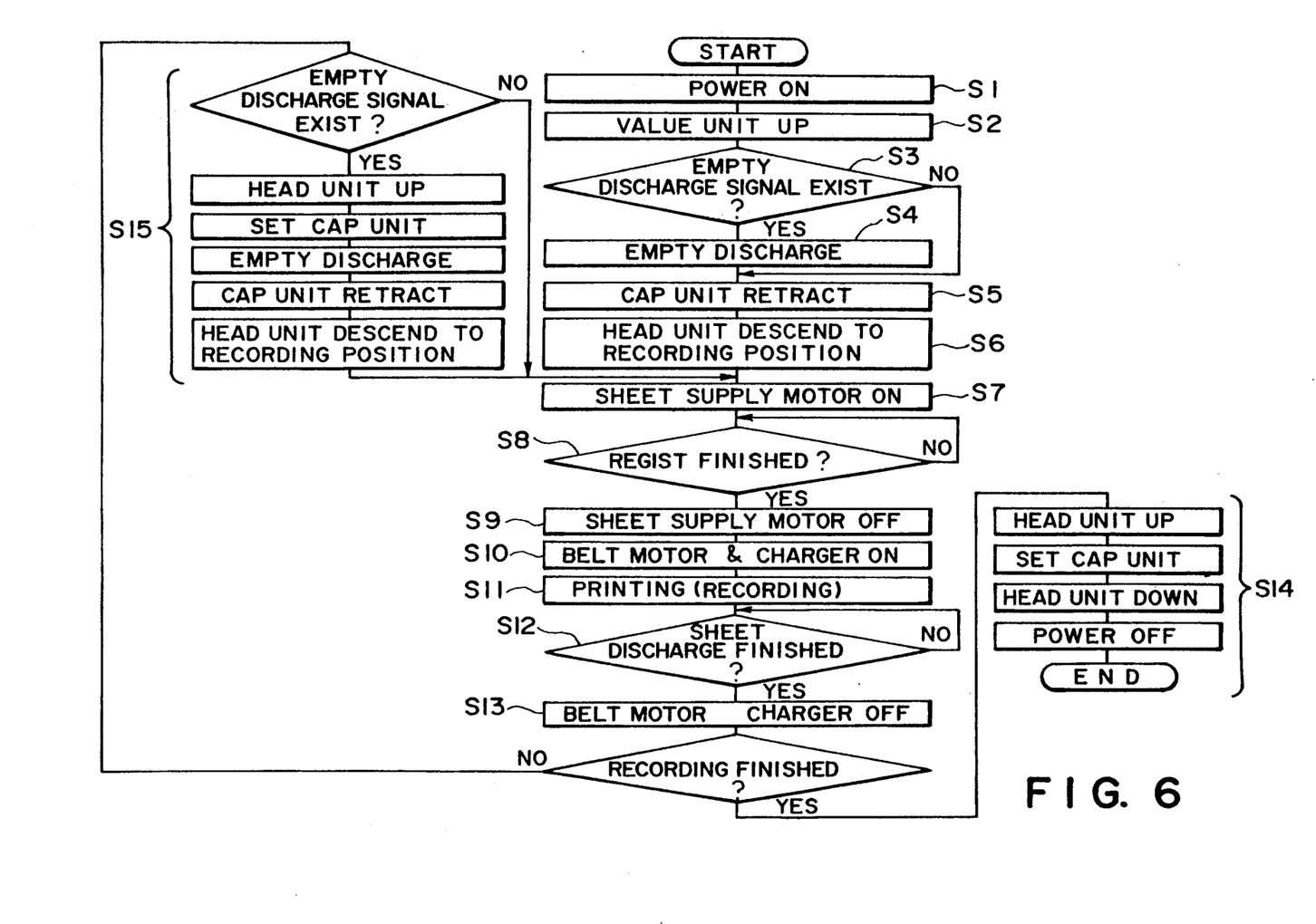
FIG. 6 is a flow chart of the ink jet recording operation.

If subsequent recordings are not to be executed, the head 2 will rise (refer to FIG. 4), cap 7a, 7b, 7c and 7d will be set (refer to FIG. 3), the head 2 will descend and be secured by cap 7a, 7b, 7c and 7d (refer to FIG. 2) and lastly the power will be turned OFF (step S1 of FIG. 6).

If subsequent recordings are to be executed, the dry run signal will be checked. If a dry run signal is detected, the head unit will rise (refer to FIG. 4), the cap unit will be set (refer to FIG. 3), the dry run will be performed, the cap unit will return to its original position (refer to FIG. 4), and subsequently the head unit will descend to the recording position (refer to FIG. 5) (refer to step S15 of FIG. 6). If a dry run signal is not detected, the paper feed motor will turn ON, and the identical recording sequence will be repeated.

The seamless belt 11 rotates normally because a centripetal force generated by the seamless belt 11 attempting to move towards the center is strong since the belt driving roller 15 is fabricated as a roller with a large crown. Also, because pressure roller 19 is supplied to add tension approximately 10 mm prior to belt driving 15, there is constant tension applied to the seamless belt 11 immediately prior to belt driving roller 15. The unevenness of the intensity or scratches on the belt will not cause buckling above the crown roller around the center of the belt which result in wrinkling and swelling of the belt.

Accordingly, a cutsheet feeding device which is capable of inexpensive long term stabilized operation was produced using a simple structured device which is proficient for normal long term rotation of belt 11.

The above embodiments were examples of a color recording device utilizing the 4 recording heads 2a, 2b, 2c and 2d. However, it is unessential to note that an identical effect may be obtained using a standard black and white recording device with only one recording head, or a device employing an equivalent recording method.

The diameter of the crown roller 15 is not limited to the value in the embodiments noted here. Also, the position of the crown roller 15 may be different as long as the relative position to the presser roller 19 is maintained. Furthermore, a shorter distance between crown roller 15 and pressure roller 17 is preferable.

The cutsheet was fed by electrostatic adsorption to belt 11 in the above embodiments, but methods of feeding such as simply placing the sheet on the belt, or vacuum adsorption of the sheet to the belt is also possible.

Figure 8:
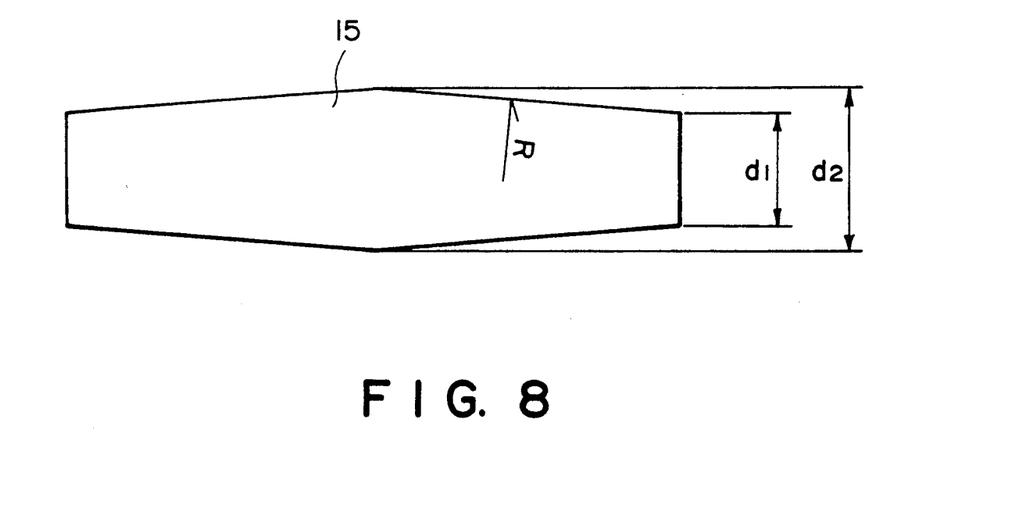
FIGS. 8 and 9 shows embodiments of crown roller.

As conceptually shown in FIG. 8, crown roller 15 is a locus of body of rotation around the axis which consists of a radii that contains a peripheral surface of a radius for curvature R, with diameter d on both ends, and the diameter of the center is the maximum, d2. The peripheral surface may be a body of rotation of a quadratic curve (for example, a part of an ellipse), around the axis. It may also be a roller formed as a cylinder with the maximum diameter d2 in the central portion and with both ends consisting of cones.

Figure 9:
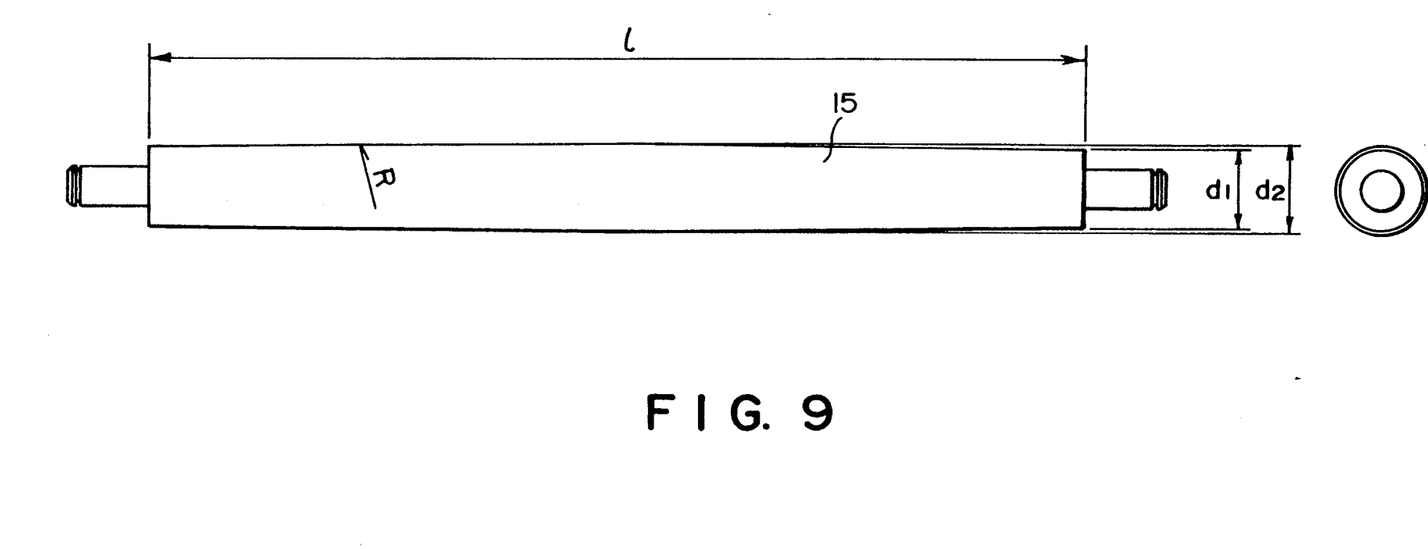

In the example provided here, it is a locus of body of rotation consisting of a radii which, as in FIG. 9, has $d1=20$ mm, $d2=22$ mm, roller length $l=230$ mm, peripheral surface with radius of curvature $R=6700$ mm, around the axis.

What is claimed is:

1. A sheet feeding device, comprising:
   an endless belt which feeds a sheet in a moving direction along a feeding path;
   primary and secondary cylindrical members which support a portion of said endless belt on which the sheet is fed to allow movement of the portion;
   a crown roller around which a portion of said endless belt located offset from the feeding path is wrapped, said crown roller applying force directed from both side peripheries of said endless belt to a central portion thereof, to a surface of said endless belt;
   a third cylindrical rotation member disposed adjacent to said crown roller to press said endless belt onto said crown roller;
   recording means, provided between said primary and secondary cylindrical members, for recording an image onto the sheet fed along the feeding path by said endless belt; and
   cleaning means, disposed downstream of said crown roller and third cylindrical roller with respect to a moving direction of said endless belt, for cleaning said endless belt.

2. A sheet feeding device according to claim 1, wherein said endless belt feeds sheets by electrostatic absorption.

3. A sheet feeding device according to claim 2, wherein said endless belt has an insulation layer on the surface.

4. A sheet feeding device according to claim 3, wherein said device further has a charger which electrifies the surface of the endless belt.

5. A sheet feeding device according to claim 1, wherein said multiple rotation members include a cylindrical roller which contains a constant diameter in full length.

6. A sheet feeding device according to claim 5, wherein said rotation members which support the portion feeding the sheet on said endless belt has a cylindrical roller.

7. A sheet feeding device according to claim 1, wherein said crown roller drives said endless belt.

8. An image recording device according to claim 1, wherein said recording means includes an ink jet head which discharges ink therefrom.

9. A sheet feeding device comprising:
   an endless belt which feeds a sheet in a moving direction along a feeding path;
   primary and second cylindrical members which support a portion of said endless belt which feeds the sheet along the feeding path to allow movement for the portion;
   a crown roller to which the portion of said endless belt which is not along said feeding path is wrapped around, said crown roller applying force directed from both side peripheries of said endless belt to a central portion thereof to a surface of said endless belt;
   driving means which rotates said crown roller for applying a moving force to said endless belt;
   a third cylindrical rotation member disposed adjacent to said crown roller to press said endless belt onto said crown roller;
   recording means for recording an image onto the sheet fed by said endless belt; and
   cleaning means, disposed downstream of said crown roller and third cylindrical rotation member with respect to a moving direction of said endless belt, for cleaning said endless belt.

10. A sheet feeding device according to claim 9, wherein said endless belt feeds sheet by electrostatic absorption.

11. An image recording device according to claim 9, wherein said recording means includes an ink jet head which discharges ink therefrom.

12. An image recording device, comprising:
    an endless belt which feeds a sheet in a moving direction along a feeding path;
    recording means which records an image onto the sheet fed along said sheet feeding path;
    a driving source;
    plural rotation members which include at least one crown roller which supports said endless belt, said crown roller being disposed so that a rotational axis thereof is orthogonal to the moving direction of said endless belt, said crown roller being rotated by said driving source to apply a moving force to said endless belt in the moving direction, said crown roller applying force directed from both side peripheries of said endless belt to a central portion thereof, to a surface of said endless belt;
    a cylindrical rotation member disposed adjacent to said crown roller to press said endless belt onto said crown roller; and
    cleaning means, disposed downstream of said crown roller and said cylindrical rotation member with respect to a moving direction of said endless belt, for cleaning said endless belt.

* * * * *

UNITED STATES PATENT AND TRADEMARK OFFICE
CERTIFICATE OF CORRECTION

PATENT NO. : 5,280,308
DATED : January 18, 1994
INVENTOR(S) : HARUHIKO TAKAHASHI, ET AL.

It is certified that error appears in the above-indentified patent and that said Letters Patent is hereby corrected as shown below:

[57] ABSTRACT,
    Line 4, "bodies" should be deleted.

Column 1,
    Line 35, "the orthogonal" should read --the direction orthogonal--; and
    Line 36, "direction" should be deleted.

Column 2,
    Line 8, "cutshirt" should be --cutshirts--;
    Line 35, "shows" should read --show--; and
    Line 64, "set" should read --set at--.

Signed and Sealed this

Twenty-third Day of August, 1994

Attest:

BRUCE LEHMAN

*Attesting Officer*      *Commissioner of Patents and Trademarks*